Oct. 22, 1957 M. S. GLASS ET AL 2,810,830

HIGH FREQUENCY OSCILLATOR

Filed July 8, 1953

INVENTORS: M. S. GLASS
J. P. MOLNAR
H. G. OCH
W. H. THATCHER

BY [signature]
ATTORNEY 2,810,830

HIGH FREQUENCY OSCILLATOR

Myron S. Glass, West Orange, Julius P. Molnar, Summit, Henry G. Och, Short Hills, and Willard H. Thatcher, Florham Park, N. J., assignors to Bell Telephone Laboratories, Incorporated, New York, N. Y., a corporation of New York Application July 8, 1953, Serial No. 376,022

1 Claim. (Cl. 250—36)

Figure 1:
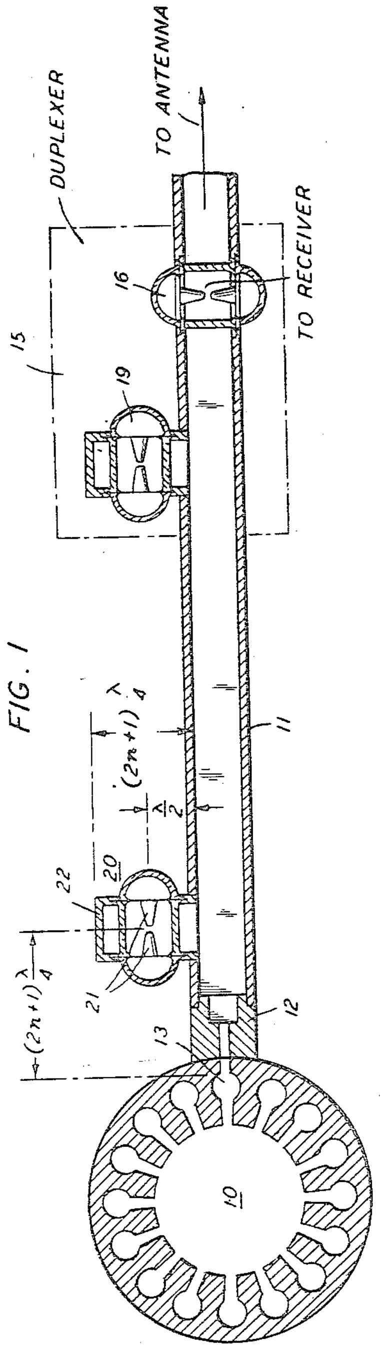

This invention relates to high frequency oscillators and more particularly to such oscillators of the magnetron type.

In ultra-high frequency generators of the type generally known as magnetrons, competition exists during the build-up of oscillations between the various possible modes of oscillation. The output circuitry and load is generally pretuned for a particular frequency corresponding to the preferred or $\pi$-mode of oscillation. If another mode of oscillation tends to start more quickly than the $\pi$-mode, due to their relative loading or for other reasons, and has a greater stability, the ultra-high frequency generator will oscillate in this undesired mode. This type of misbehavior has become known as "moding" and in pulsed magnetrons causes either partially missing or completely missing lines in the desired mode spectrum.

A more complete discussion of the competition between the various modes at the start of the oscillation build-up and of moding in general may be found in the chapter entitled "Transient Behavior" by Rieke in "Microwave Magnetrons" (Collins, Ed., M. I. T. Series, volume 6) and at section 10.6 in the article "The Magnetron as a Generator of Centimeter Waves" by Fisk, Hagstrum, and Hartman at page 253, volume 25, of the Bell System Technical Journal (April 1946).

One of the main reasons for moding is the relative loading of the possible modes of oscillation. As mentioned above, the output circuitry and output load will be coupled to the preferred mode of oscillation while the other modes may be left almost entirely unloaded. This discrepancy in the relative loading of the modes may slow down the commencement of oscillation in the preferred mode sufficiently to allow oscillation instead to build up in another mode. Prior attempts to prevent moding have been concerned with equalizing the loading of the preferred mode and at least that mode nearest thereto in frequency and therefore the most likely to commence oscillations instead. This has been done by heavily loading the other modes of oscillation.

It is a general object of this invention to improve the operation of ultra-high frequency generators, such as magnetron oscillators, and more specifically it is an object of this invention to prevent moding in such generators.

In accordance with one aspect of this invention, the desired mode of oscillation of the ultra-high frequency generator is selectively decoupled from the load or output circuitry during the build up of oscillation but is immediately coupled when power is to be transmitted in this mode. By removing the load from the desired or $\pi$-mode of oscillation, the natural preference of the oscilatory system to oscillate in this mode will ensure that oscillations build up in this mode and thus that moding is prevented. It is therefore not necessary to load the other or undesired modes of oscillation, though this may be done in conjunction with the decoupling of the desired mode of oscillation.

In one specific illustrative embodiment of this invention wherein the ultra-high frequency generator is a magnetron of fixed frequency, the selective decoupling of the $\pi$-mode of oscillation of the magnetron is attained by positioning a gaseous discharge device having a resonant cavity associated therewith in series in the output line an odd number of quarter wavelengths of the frequency of the $\pi$-mode of oscillation away from the output resonator of the magnetron anode structure. The gaseous discharge device may advantageously be of the type known as ATR tubes or switches and employed in duplexers, example of which tubes may be found in the chapter entitled "Characteristics of ATR Switches at Low Power Levels" by H. K. Farr in "Microwave Duplexers" (Smullin and Montgomery, Ed., M. I. T. Series, volume 14) and particularly the tubes at pages 136 and 138 thereof.

In another specific illustrative embodiment of this invention wherein the ultra-high frequency generator is a magnetron of fixed frequency, the selective decoupling of the $\pi$-mode of oscillation of the magnetron is attained by positioning a gaseous discharge device having a resonant cavity associated therewith in shunt across the output line so as to place a short-circuit at the center of the wave guide a number of half wavelengths of the frequency of the $\pi$-mode of oscillation away from the output resonator of the magnetron anode structure. Such a device may be an ATR tube of the type disclosed at page 132 of the above-mentioned book "Microwave Duplexers."

It is the characteristic of these types of tubes that they are normally unfired, i. e., there is no discharge between electrodes, but that the power output of the magnetron causes the tube to break down due to a resonant cavity structure either incorporated in the tube or associated therewith. When placed in series in the output line of the ultra-high frequency generator, in accordance with one specific embodiment of this invention, which output line may advantageously be a wave guide, these tubes present an open circuit in the line at all times except when power is being transmitted from the generator; at these latter times they break down, completing and closing the output circuit. When broken down they have thus effectively removed themselves from the circuit.

Thus, before oscillation starts, the gaseous discharge device will not have fired and will therefore be an open circuit in series with the wave guide output. This high impedance, in accordance with this invention, is reflected back to the output resonator of the magnetron as a low impedance for the $\pi$-mode frequency, thus causing a very light or negligible loading of the $\pi$-mode to exist during build-up. Once the oscillations have commenced, the gaseous discharge device will fire and be removed from the output circuit as explained above; at this time the $\pi$-mode will be coupled to the load.

As the positioning of the gaseous discharge device is determined by the $\pi$-mode frequency, i. e., that it be approximately an odd number of quarter wavelengths of the $\pi$-mode frequency from the output resonator of the magnetron, only the $\pi$-mode will have reflected back to it a negligible impedance from the open circuit introduced by the gaseous discharge device. The other modes of oscillation will have some load applied to them by the gaseous discharge device depending on the frequencies of those modes and the distance of the gaseous discharge device from the output resonator of the magnetron in terms of those frequencies.

If the ultra-high frequency generator is tunable over a band of frequencies, the gaseous discharge device is advantageously positioned in series in the output wave guide so as to be an odd number of quarter wavelengths from the output of the generator in terms of the mid-band frequency of the generator. In prior tunable ultra-high frequency generators of the magnetron type, the band width has occasionally been limited due to moding at certain frequencies, the moding resulting from impedance reflections from a load or a duplexer appearing as high impedances to the π-mode frequency at the output resonator. By positioning a gaseous discharge device in the output circuit, in accordance with this invention, the tuning range can be extended and its exact limits varied, the range and the particularly frequencies defining the tuning range being determined when a frequency of the π-mode is such that the gaseous discharge device is a multiple of a half wavelength from the output resonator of the magnetron, under which conditions the high open circuit impedance of the unfired gaseous discharge device is reflected back to the output resonator as a high impedance, causing moding. Therefore, in tunable ultra-high frequency generators, it is desirable to position the gaseous discharge device such that at no point in the tuning range will a π-mode frequency be such that the distance from the gaseous discharge device to the output of the generator approaches a multiple of a half wavelength in terms of that frequency.

When the gaseous discharge device is placed in shunt across the output line of the ultra-high frequency generator, in accordance with another specific embodiment of this invention, the device and the resonant cavity associated therewith are so positioned from the center of the wave guide that the wave guide presents a short-circuit at the location of the device when the device has not broken down. The location of the ATR tube is chosen so as to be a multiple of half wavelengths of the frequency of the π-mode from the output of the ultra-high frequency generator, so that, when the tube has not fired, the short-circuit placed by it in the wave guide is reflected back effectively to unload the π-mode of oscillation during build up of oscillation. Once the oscillations have commenced, the tube will fire and be removed from the output circuit, the discharge of the tube being positioned from the center of the wave guide so that an open circuit appears at the center of the wave guide.

The introduction of a gaseous discharge device in accordance with this invention removes from consideration, before the device fires, anything beyond it, so that during the critical build-up period, the generator will not see or be aware of the existence of any load or output that may be connected in or to the output circuit. Thus, the generator will commence oscillating in the desired mode and will deliver power even into an initially mismatched load.

In those applications of magnetrons where duplexers are employed, the ATR tube of the duplexer may itself be utilized as the gaseous discharge device positioned in the output line in accordance with our invention. Or advantageously an additional ATR tube may be located nearer the magnetron than the duplexer; this added ATR tube will not in any way interfere with the operation of the rest of the circuit, as it fires as soon as the magnetron approaches full power output, as described above.

It is a feature of this invention that a gaseous discharge device having an associated resonant cavity be positioned from an ultra-high frequency generator capable of oscillating in more than one mode so as selectively to present a low impedance to a preferred mode of oscillation of the generator during the build-up of oscillation effectively to unload the preferred mode and thereby prevent the build-up of oscillation in other than the preferred mode.

It is a further feature of this invention that a gaseous discharge device having an associated resonant cavity be positioned in the output circuit of a magnetron so as to uncouple the π-mode of oscillation of the magnetron from any load connected to the output circuit during the build-up of oscillation in the magnetron and thereby prevent moding, the device being fired on transmission of power from the magnetron to the output circuit.

It is a feature of one specific embodiment of this invention that a gaseous discharge device be positioned in series in the output circuit of an ultra-high frequency generator approximately an odd number of quarter wavelengths of the frequency of the desired mode of operation of the generator away from the output of the generator.

It is another feature of this emobdiment of this invention that a gaseous discharge device be positioned in series in the output line of a fixed frequency magnetron approximately an odd number of quarter wavelengths of the frequency of the π-mode of oscillation of the magnetron from the output reasonator of the magnetron.

It is a still further feature of this embodiment of this invention that a gaseous discharge device be positioned in series in the output circuit of a tunable magnetron approximately an odd number of quarter wavelengths of the mid-band frequency of the π-mode of oscillation of the magnetron away from the output resonator of the magnetron. In accordance with this feature of the invention, the gaseous discharge device is positioned so that at no point in the tuning range is it a multiple of a half wavelength of the π-mode frequency from the magnetron output resonator.

It is a feature of another specific embodiment of this invention that a gaseous discharge device be positioned in shunt across the output circuit of an ultra-high frequency generator approximately a multiple of half wavelengths of the frequency of the desired mode of operation of the generator away from the output of the generator, the gaseous discharge device placing a short-circuit at the center of the wave guide at the point where it is across the wave guide.

In accordance with another feature of this invention, the gaseous discharge device may be of the type known as ATR tubes and may be either the ATR tube of a duplexer located in the output circuit of the magnetron or may be another ATR tube positioned before the duplexer.

A complete understanding of this invention and of these and other features thereof may be gained from the description set forth herein with reference to the drawing, the two figures of which are diagrammatic representations of two specific illustrative embodiments of ultra-high frequency generators in accordance with this invention.

Referring now to Fig. 1 of the drawing, the ultra-high frequency generator 10 may advantageously comprise a magnetron of known structure. A fixed frequency magnetron that may be utilized in the combination of this invention may be of the type disclosed in Patent 2,466,922, issued April 12, 1949, to N. Wax, and a tunable magnetron that may be utilized may be of the type disclosed in Patent No. 2,657,334, issued October 27, 1953 to J. W. West, though this invention is not to be considered as limited to any particular types of ultra-high frequency generators or magnetrons. Advantageously, an output wave guide 11 is connected, as by an impedance transforming section 12, as is known in the art, to the output resonator cavity 13 of the magnetron anode structure. Situated in the output wave guide 11 is a duplexer 15 comprising, as is known in the art, a TR switch or tube 16 located across a shunt wave guide section connected to a receiver unit, and an ATR switch or tube 19 located in series in the wave guide output 11, which is connected to an antenna unit. The duplexer 15 and antenna, not shown, may be considered as comprising the load of the magnetron 10.

Positioned in the wave guide 11 and in series therewith between the generator 10 and the duplexer 15 is a resonant gas-filled discharge device 20 which may advantageously be of the ATR tube type and thus be similar to the ATR tube 19. Such tubes have been also referred to in the art as RT and anti-TR tubes or switches and, as is known, TR tubes themselves may be utilized as ATR tubes or switches. The characteristics of the gaseous discharge device 20 are that it is an open circuit, when unfired, and that upon the transmission of power from the generator 10, the device 20 fires and removes itself from the circuit. Its electrodes 21 are thus advantageously a multiple of half wavelengths from the walls of the wave guide 11.

In accordance with this one specific embodiment of this invention, the device 20 is located approximately an odd number of quarter wavelengths in terms of the π-mode of oscillation of the generator from the output resonator 13 so that the high impedance of the unfired or open circuit condition of the device 20, due to positioning of the end wall 22 an odd number of quarter wavelengths of the π-mode frequency from the wall of the wave guide 11, will be reflected back to the output resonator as a low or negligible impedance, thereby unloading the π-mode during the build-up of oscillation and thus preventing moding. This distance is the critical distance for selective decoupling or unloading of the π-mode of oscillation. If the generator 10 is tunable over a band of frequencies, the critical distance is advantageously an odd multiple of a quarter wavelength in terms of the mid-band frequency of the tuning band and at no frequency in the tuning band is the critical distance a multiple of half wavelengths long.

Figure 2:
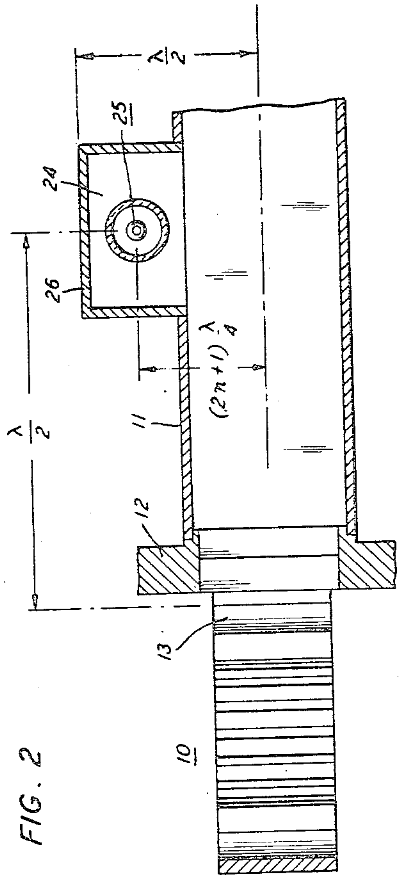

Turning now to Fig. 2, in this specific illustrative embodiment of this invention, gaseous discharge device 24, having an associated cavity therewith which together may comprise an ATR tube as discussed above, is positioned across the output wave guide 11 so as to be located a multiple of half wavelengths of the π-mode frequency of the magnetron 10 from the output resonator 13 of the magnetron. When no power is being transmitted into the wave guide 11, no discharge will have broken down between the electrodes 25 of the tube 24 and an effective short-circuit will appear at the center of the wave guide to the π-mode frequency as the end wall 26 of the tube 24 is positioned a multiple of half wavelengths of the π-mode frequency from the center of the wave guide. This short-circuit will be reflected back to the output resonator 13 as a short-circuit to the π-mode frequency, thereby effectively uncoupling the π-mode of oscillation from any load during the build-up of oscillation and thus preventing moding.

When oscillations have commenced and power is being transmitted by the magnetron 10 into the wave guide 11, the ATR tube 24 will break down and a discharge will exist between the electrodes 25. This discharge will be reflected at the center of the wave guide as an open circuit as the electrodes 25 are advantageously positioned an odd number of the quarter wavelengths of the π-mode frequency from the center line of the wave guide. In this manner, the ATR tube 24 will be removed from the output circuit during the transmission of power to the load.

If the magnetron 10 is tunable over a band of frequencies, the ATR tube 24 is advantageously positioned so as to be approximately a number of half wavelengths of the mid-band π-mode frequency of the magnetron away from the output resonator 13.

While the gaseous discharge device 20 has been depicted in addition to the ATR tube 19 of the duplexer 15, it is to be understood that the ATR tube 19 may be utilized to prevent moding as disclosed herein, thereby obviating the necessity of the additional gaseous discharge devices 20 and 24.

It is to be understood that the above-described arrangements are illustrative of the application of the principles of the invention. Other arrangements may be devised by those skilled in the art without departing from the spirit and scope of the invention.

What is claimed is:

In combination, a magnetron, an output wave guide associated with said magnetron, a load connected to said wave guide, and means positioned in said wave guide for selectively decoupling the π-mode of oscillation of said magnetron from said load during the build-up of oscillation in said magnetron, said means including a gaseous discharge device having a resonant cavity associated therewith positioned in shunt across said wave guide at a point approximately a multiple of half wavelengths of the π-mode frequency from said magnetron, the end wall of said resonant cavity being a multiple of half wavelengths of said π-mode frequency from the center line of said wave guide at said point and the discharge in said device being an odd number of quarter wavelengths of said π-mode frequency from said center line at said point.

References Cited in the file of this patent

UNITED STATES PATENTS

| | | |
|---|---|---|
| 2,422,190 | Fiske | June 17, 1947 |
| 2,632,854 | Altar et al. | Mar. 24, 1953 |
| 2,656,530 | Grant et al. | Oct. 20, 1953 |
| 2,710,923 | Chang et al. | June 14, 1955 |